United States Patent
Galvin

(10) Patent No.: US 12,016,317 B1
(45) Date of Patent: Jun. 25, 2024

(54) DIP NET

(71) Applicant: Galvpro Outdoors, LLC, Miami, FL (US)

(72) Inventor: Bradley Galvin, Miami, FL (US)

(73) Assignee: Galvpro Outdoors, LLC, Miami, FL (US)

(*) Notice: Subject to any disclaimer, the term of this patent is extended or adjusted under 35 U.S.C. 154(b) by 99 days.

(21) Appl. No.: 17/933,382

(22) Filed: Sep. 19, 2022

(51) Int. Cl.
*A01K 77/00* (2006.01)

(52) U.S. Cl.
CPC ................... *A01K 77/005* (2022.02)

(58) Field of Classification Search
CPC ....... A01K 77/005; A01K 77/00; A01K 74/00
See application file for complete search history.

(56) References Cited

U.S. PATENT DOCUMENTS

| | | | |
|---|---|---|---|
| 3,849,926 A | 11/1974 | Fox | |
| 4,446,646 A | 5/1984 | Van't Veld | |
| 4,509,286 A | 4/1985 | John | |
| 4,815,227 A | 3/1989 | Flanders, Sr. | |
| 5,442,875 A | 8/1995 | Brundage et al. | |
| 5,536,107 A * | 7/1996 | Baker | E04H 4/1609 403/373 |
| 5,996,267 A | 12/1999 | Breckenridge | |
| 7,395,629 B1 | 7/2008 | Thomas | |
| 8,806,801 B2 | 8/2014 | Steffens | |
| D763,520 S | 8/2016 | Runyan | |
| 10,334,831 B2 | 7/2019 | Kudner | |
| 10,401,131 B1 * | 9/2019 | Remaklus | F41J 1/10 |
| 10,470,440 B1 | 11/2019 | Kim | |
| 11,166,442 B2 | 11/2021 | Vesich et al. | |
| 11,229,196 B1 * | 1/2022 | Sohnle | A01K 77/00 |
| 2004/0068914 A1 * | 4/2004 | Wellard | A01K 77/00 43/12 |
| 2006/0185215 A1 | 8/2006 | Corbett | |
| 2009/0255166 A1 | 10/2009 | Ting | |
| 2012/0036758 A1 | 2/2012 | Steffens | |

* cited by examiner

*Primary Examiner* — Brady W Frazier
*Assistant Examiner* — Shanna Danielle Glover
(74) *Attorney, Agent, or Firm* — ALBERT BORDAS P.A.

(57) ABSTRACT

A dip net, which has a net assembly, a handle assembly connected to the net assembly, and a retaining frame securing the net assembly to the handle assembly. The net assembly has a net frame with respective distal ends and a net. The handle assembly has a handle having first and second ends, a neck, and first and second flat sides. The retaining frame has first and second walls connected by a bend. The retaining frame is U-shaped. The retaining frame is removably connected to the handle assembly. The first wall is attached to the first flat side and the second wall is attached to the second flat side. The net frame and the handle are secured by the retaining frame defining a predetermined angle. The predetermined angle is adjustable.

15 Claims, 5 Drawing Sheets

DIP NET

BACKGROUND OF THE INVENTION

Field of the Invention

The present invention relates to nets, and more particularly, to a dip nets.

Description of the Related Art

Applicant believes that one of the closest references corresponds to U.S. Pat. No. 8,806,801 B1 issued to Steffens on Aug. 19, 2014, for Fish landing net. However, it differs from the present invention because Steffens teaches a landing net having a net member attached to a connecting member that is attached to a handle. The connecting member has at least two locking rings and a receiver attached to each locking ring. Each locking ring has a bushing attached to an inner surface of the ring. The receivers have a non-circular shape and extend parallel to a central axis of the rings.

Applicant believes that another reference corresponds to U.S. Pat. No. 5,996,267 A issued to Breckenridge on Dec. 7, 1999, for Landing net. However, it differs from the present invention because Breckenridge teaches a landing net and comprises a hoop shaped net body member, which is secured to one end of a handle. A hinge is located between the two ends of the handle and which permits a section of the handle to be folded from a first fully extended configuration to a second folded configuration in which the other end of the handle is adjacent to the hoop shaped net body member. When the folding section of the handle is in the second configuration, it is selectively attachable to the net body member.

Applicant believes that another reference corresponds to U.S. Pat. No. 4,815,227 A issued to Flanders on Mar. 28, 1989, for Anti-drifting fish landing net. However, it differs from the present invention because Flanders teaches a fish landing net having a cord attached to the apex of the net webbing for preventing drifting of the webbing during landing of a fish. One end of the cord is attached to the apex of the webbing and the other is attached to a weight slidably received within the hollow portion of the landing net handle.

Applicant believes that another reference corresponds to U.S. Pat. No. 3,849,926 A issued to Fox on Nov. 26, 1974, for Dip net. However, it differs from the present invention because Fox teaches a rigid hoop is held in fixed position in a tubular handle by means of a solid plug, which is tightly fitted into the end of the handle and which has parallel channels extending from the end of the plug inwardly along opposite sides and a cross-bore joining the channels, all of which is adapted to receive a pair of arms extending outwardly from the periphery of the hoop and terminating in inwardly turned portions inserted in opposite ends of the cross-bore. This is a particularly good construction for making dip nets for use in crabbing or fishing where a handle is made of light weight tubular aluminum and the hoop is formed of a steel rod.

Applicant believes that another reference corresponds to U.S. Pat. No. 7,395,629 B1 issued to Thomas on Jul. 8, 2008, for Devices incorporating flexible. However, it differs from the present invention because Thomas teaches a portable illuminated, transparent, or translucent tubular device. The light source is a flexible, extended-in-length light source mounted in the tubular device, with a housing associated with the tubular device. The housing encloses batteries, and in some instances circuitry, for powering the light source. The tubular device is a handle for a fish or crab net, with the light source extending around the loop of the net.

Applicant believes that another reference corresponds to U.S. Pat. No. 5,442,875 A issued to Brundage, et al. on Aug. 22, 1995, for Net apparatus. However, it differs from the present invention because Brundage, et al. teach a net apparatus for catching aquatic animals that includes a substantially transparent monofilament netting attached to a substantially transparent, hollow, tubular rim, which is attached to a substantially transparent, hollow, tubular handle. One or more openings allows water to flow into the hollow interior of both the rim and the handle when immersed underwater. The handle includes two openings for receiving the two ends of the rim. An elliptical cross-section of both the rim and the openings in the handle afford assembly of the dip net apparatus by inserting the ends of the rim into the corresponding handle openings and friction locking the rim to the handle by twisting the rim relative to the handle.

Applicant believes that another reference corresponds to U.S. Pat. No. 4,446,646 A issued to Van't Veld on May 8, 1984, for Retractable landing net. However, it differs from the present invention because Van't Veld teaches a telescopable retractable landing net for fish. The net is attached to the retractable hoop by resilient hooks. The hooks are spaced around the inner periphery of the hoop and do not extend above the upper surface of the hoop nor below the bottom surface of the hoop, the outer periphery of the hoop is substantially smooth, therefore, the hoop is free of rough surfaces that would restrict the ability of the hoop to be retracted into its hollow handle.

Applicant believes that another reference corresponds to U.S. Pat. No. 4,509,286 A issued to John on Apr. 9, 1985, for Trawl shrimp cage. However, it differs from the present invention because John teaches a vessel supported shrimp trawl cage system that provides a pair of spaced apart nets which are supported at the water surface by the vessel so that a forward end of the net defines a net opening, and the rear of the net defines a tail. A pair of cages corresponding to the pair of nets are supported in a partially submerged position by the vessel and have a cage inlet which is forward facing and connects to the tail of the net so that shrimp caught in the net are fed into the cage via the tail of the net. The cage includes a plurality of cage surfaces of preferably rigid perforated material such as expanded metal and are connected at their edges to form an enclosure which confines the shrimp entering the cage from the nets. Confinement is preferably on the top, sides, and bottom as well as the rear so that the shrimp cannot escape by swimming or by jumping from the cage. The rear of the cage provides a removable opening so that trash, fish, small shrimp, or other unwanted marine life can be discharged from the net as desired.

Applicant believes that another reference corresponds to U.S. Pat. No. 11,229,196 B1 issued to Sohnle on Jan. 25, 2022, for Catch and release apparatus. However, it differs from the present invention because Sohnle teaches an apparatus for releasing fish from a hook while the fish is in water includes a rod having a first rod end and an opposite second rod end. A frame extends from the second rod end, and netting is wrapped around the frame and configured to ensnare the hook such that the hook can be removed from the fish thereby releasing the fish.

Applicant believes that another reference corresponds to U.S. Pat. No. 11,166,442 B1 issued to Vesich, et al. on Nov. 9, 2021, for Net having hoop frame connected to handle. However, it differs from the present invention because Vesich, et al. teach a net for fishing or other purposes that includes a hoop frame connected to a pole by a yoke. The yoke defines sockets in which respective arms of the hoop frame and a distal end of the pole are received. Plugs in the arms of the hoop frame desirably prevent water from passing the plugs into the hoop frame. A plug in the distal end of the pole desirably prevents water from passing the plug into the pole. The yoke and plugs provide a robust connection of the hoop frame to the pole and help retain air in the hoop frame and pole for buoyancy of the net.

Applicant believes that another reference corresponds to U.S. Pat. No. 10,470,440 B1 issued to Kim on Nov. 12, 2019, for Animal waste collection device. However, it differs from the present invention because Kim teaches an animal waste collection device includes an elongated shaft having a channel extending through at least a portion thereof. A handle is proximate a first end of the shaft. A loop is proximate a second end of the shaft and extends at an obtuse angle relative to the shaft so the loop can be held parallel to the ground. Clips are coupled to the loop to grasp an open-end of a disposable bag. An adjustment mechanism is maneuverable to reduce of a size of the loop by pulling a portion of the coated cable into the channel of the shaft, and maneuverable to increase the size of the loop by pushing a portion of the coated cable out of the channel of the shaft. The size of the loop controls an extent to which an open-end of a disposable bag is held open by the loop.

Applicant believes that another reference corresponds to U.S. Pat. No. 10,334,831 B1 issued to Kudner on Jul. 2, 2019, for Fishing net and method of manufacturing same. However, it differs from the present invention because Kudner teaches a fishing net that includes a hoop formed of a section of tubing bent to a loop-like configuration, the hoop defining a net opening. An elongate handle is secured to the hoop at a proximal portion thereof, and a net bag is supported on the hoop. The hoop is formed with a cross-sectional profile that varies along at least a portion of the length of the section of tubing. A method of forming a hoop for a fishing net is also provided.

Applicant believes that another reference corresponds to U.S. Pat. No. D763,520 S issued to Runyan on Aug. 9, 2016, for Waste collection device. However, it differs from the present invention because Runyan teaches an ornamental design for a waste collection device.

Applicant believes that another reference corresponds to U.S. Patent Application Publication No. 2009/0255166 A1, published on Oct. 15, 2009, to Runyan for Hand net. However, it differs from the present invention because Runyan teaches a hand net comprises a rod body, of which one end has a handle portion and the other end supports a net portion through a hoop, in which the hoop includes: a T-shaped member of which one end is connected to the rod body and the other two ends form a pair of opposite support ends, each support end being provided with a pivot bearing portion; a pair of flexible rods passing through a roll-rim channel of the net portion respectively. One end of each flexible rod has a ball stud pivotally mounted in the pivot bearing portion. The other ends of the flexible rods can be detachably connected with each other through a pair of connection bars.

Applicant believes that another reference corresponds to U.S. Patent Application Publication No. 2012/0036758 A1, published on Feb. 16, 2012, to David A. Steffens for Fish landing net. However, it differs from the present invention because Steffens teaches a landing net having a net member attached to a connecting member that is attached to a handle. The connecting member has at least two locking rings and a receiver attached to each locking ring. Each locking ring has a bushing attached to an inner surface of the ring. The receivers have a non-circular shape and extend parallel to a central axis of the rings.

Applicant believes that another reference corresponds to U.S. Patent Application Publication No. 2006/0185215 A1, published on Aug. 24, 2006, to Grant for Landing net with filled handle. However, it differs from the present invention because Grant teaches a landing net for use in sport fishing and, more specifically, to a landing net having a filled handle providing desirable flotation and strengthening properties.

Other patents describing the closest subject matter provide for a number of more or less complicated features that fail to solve the problem in an efficient and economical way. None of these patents suggest the novel features of the present invention.

SUMMARY OF THE INVENTION

The present invention is a dip net, comprising a net assembly, a handle assembly connected to the net assembly, and a retaining frame securing the net assembly to the handle assembly. The net assembly comprises a net frame with respective distal ends and a net. The handle assembly comprises a handle having first and second ends. The handle further comprises a neck having first and second flat sides with first and second handle holes. The first and second flat sides extend from the neck to the first end. The retaining frame comprises first and second walls connected by a bend. The retaining frame is U-shaped. The first and second walls each comprise a pair of holes. The first and second walls comprise first and second frame ends respectively.

The handle receives the distal ends of the net frame through the first end. The retaining frame is removably connected to the handle assembly. The retaining frame is mounted to the net assembly and the handle assembly, whereby the bend is fitted over a section of the net assembly extending to the distal ends, and the first and second walls are secured to the handle. More specifically, the first wall is secured onto the first flat side, and the second wall is secured onto the second flat side of the handle assembly by bolts or screws, and nuts. The holes align with the first and second handle holes to receive the bolts or screws. The net frame defines a plurality of shapes and sizes. The net frame and the handle are secured by the retaining frame defining a predetermined angle. The predetermined angle is defined by the distal ends with respect to the net frame. The flat sides define a predetermined width so as to snugly receive the distal ends therein, considering that the distal ends are spaced apart a predetermined distance and are in a parallel configuration with each other. The predetermined distance that the distal ends are spaced apart is slightly wider than a body or shank diameter of the bolts or screws.

It is therefore one of the main objects of the present invention to provide a dip net for multiple uses such as for lobstering, shrimping, butterfly catching, etc.

It is another object of this invention to provide a dip net having a retaining frame.

It is another object of this invention to provide a dip net that is volumetrically efficient for carrying, transporting, and storage.

It is another object of this invention to provide a dip net that can be readily assembled and disassembled without the need of any special tools.

It is another object of this invention to provide a dip net, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE INVENTION

Figure 1:
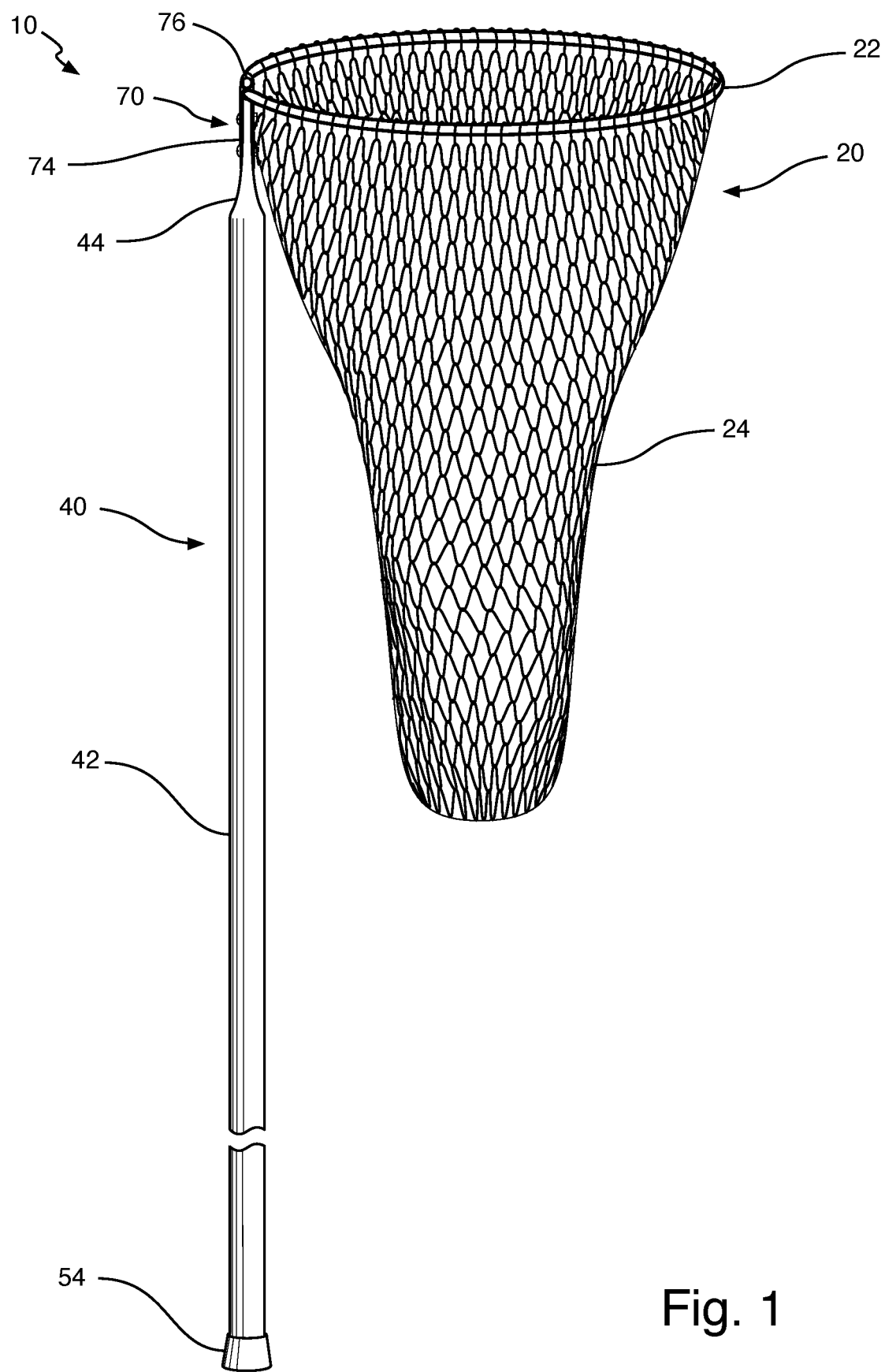
FIG. 1 is an isometric view of the present invention.

Referring now to the drawings, the present invention is a dip net, and is generally referred to with numeral 10. It can be observed that it basically includes net assembly 20, handle assembly 40, and retaining frame 70.

As seen in FIG. 1, retaining frame 70 secures net assembly 20 to handle assembly 40. In a preferred embodiment, handle assembly 40 is generally tubular or cylindrical in shape. Net assembly 20 comprises net frame 22 having net 24 secured thereon.

Figure 2:
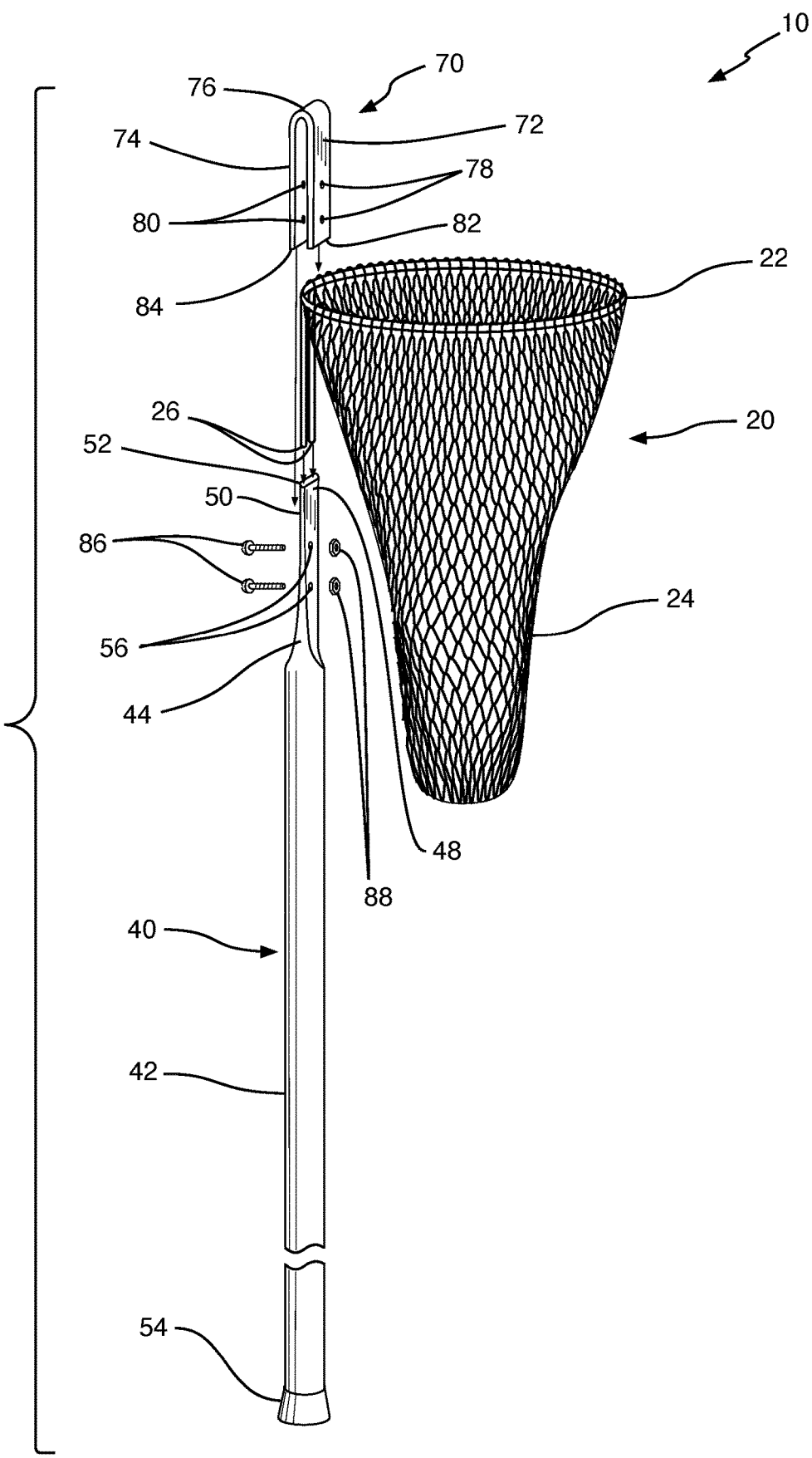
FIG. 2 is an exploded view of the present invention.
Figure 3:
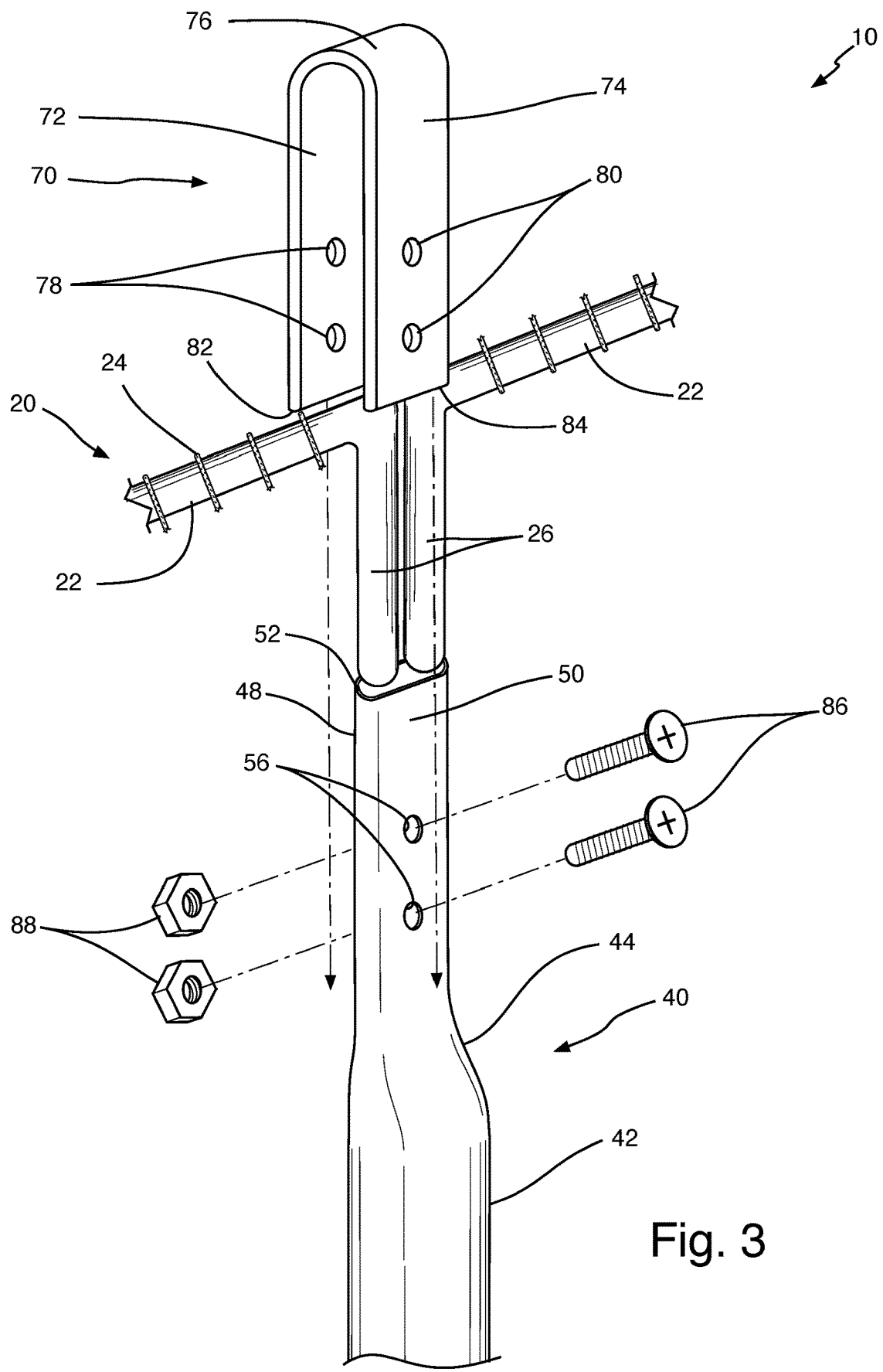
FIG. 3 is an enlarged exploded view of a retaining frame, a net frame, and a handle.

As seen in FIGS. 2 and 3, handle assembly 40 comprises handle 42 having first and second ends 52 and 54 respectively. Handle 42 further comprises a tapered section defined as neck 44. Neck 44 has first and second flat sides 48 and 50 respectively that have first and second handle holes 56, whereby first and second flat sides 48 and 50 extend from neck 44 to first end 52. Retaining frame 70 comprises first wall 72, second wall 74, and bend 76 that form a U-shape. First wall 72 comprises holes 78, and second wall 74 comprises holes 80. First and second walls 72 and 74 comprise first and second frame ends 82 and 84 respectively.

Figure 4:
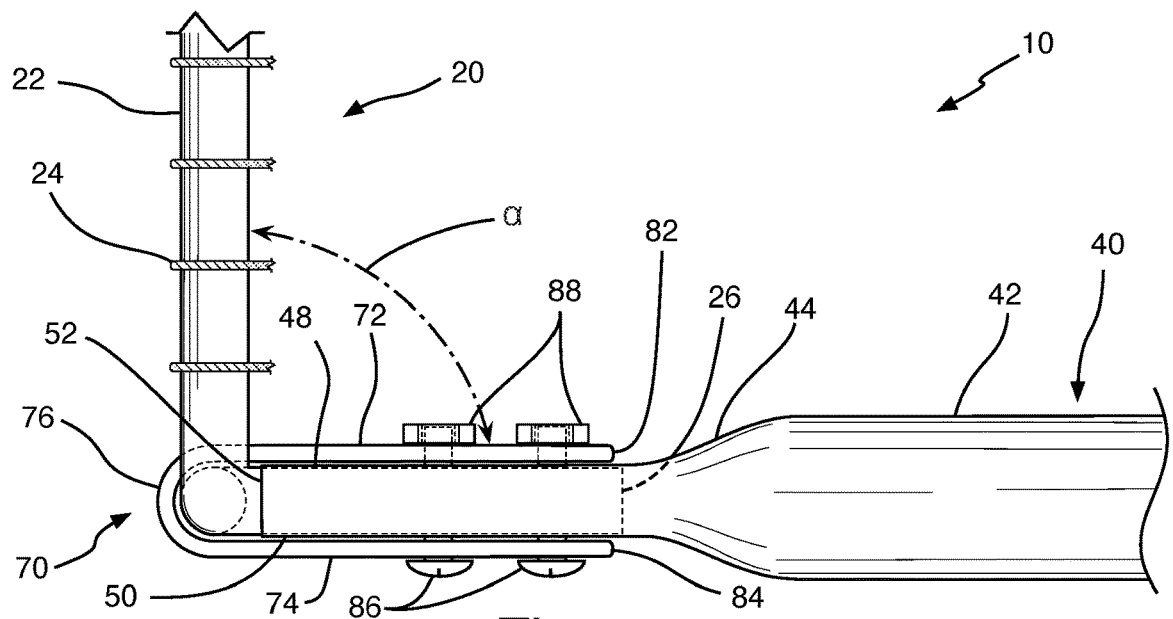
FIG. 4 is an enlarged side view of an assembly between the retaining frame, a first embodiment for the net frame, and the handle.

As seen in FIGS. 3 and 4, frame assembly 20 further comprises distal ends 26. In a preferred embodiment, distal ends 26 are parallel with respect to each other and snugly fit within neck 44, whereby handle 42 receives distal ends 26 through first end 52 of neck 44. Retaining frame 70 is removably secured onto handle assembly 40. More specifically, retaining frame 70 mounts onto net assembly 20 and neck 44 of handle assembly 40, whereby bend 76 is fitted over a section of net assembly 20 extending to distal ends 26. First and second walls 72 and 74 respectively are secured onto handle 42. As an example, first wall 72 secures onto first flat side 48 of neck 44, and second wall 74 secures onto second flat side 50 of neck 44. In a preferred embodiment, flat sides 48 and 50 are approximately parallel with respect to each other so as to snugly receive distal ends 26 therebetween. In addition, in a preferred embodiment, flat sides 48 and 50 define a predetermined width so as to snugly receive distal ends 26 therein, taking into account that distal ends 26 are spaced apart a predetermined distance and are in a parallel configuration with each other. Retaining frame 70 therefore secures the section of net assembly 20 extending to distal ends 26 when mounted onto neck 44, whereby retaining frame 70 is secured to handle assembly 40 by securing means. Such securing means can be bolts or screws 86, and nuts 88 for example. Holes 78 and 80 align with respective first and second handle holes 56 to receive screws 86.

Figure 5:
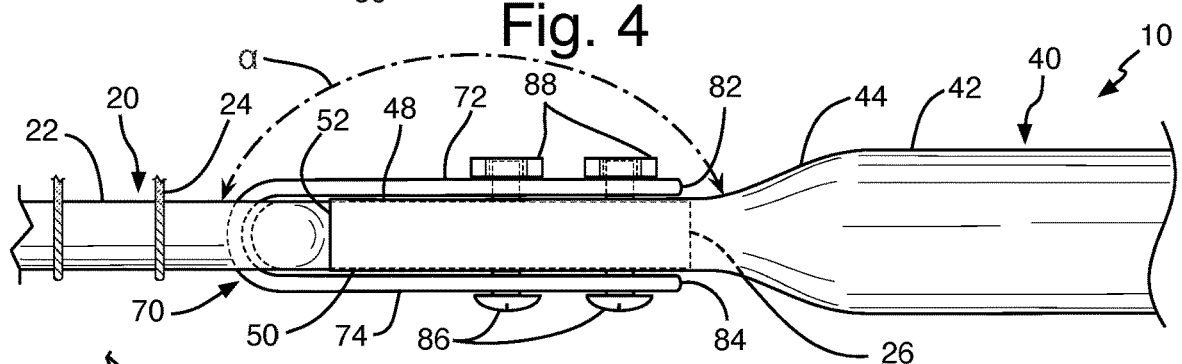
FIG. 5 is an enlarged side view of the assembly between the retaining frame, a second embodiment of the net frame, and the handle.
Figure 6:
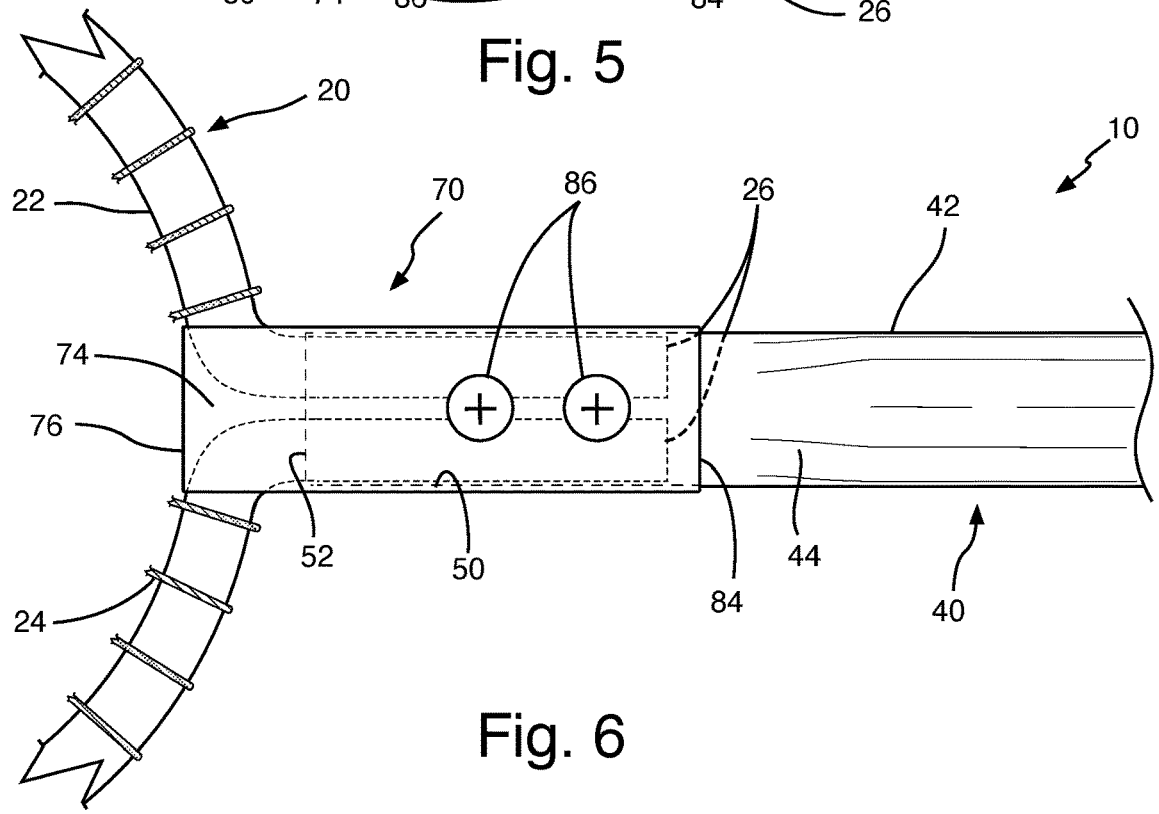
FIG. 6 is an enlarged front view of the assembly between the retaining frame, the second embodiment shown in FIG. 5, and the handle.
Figure 7:
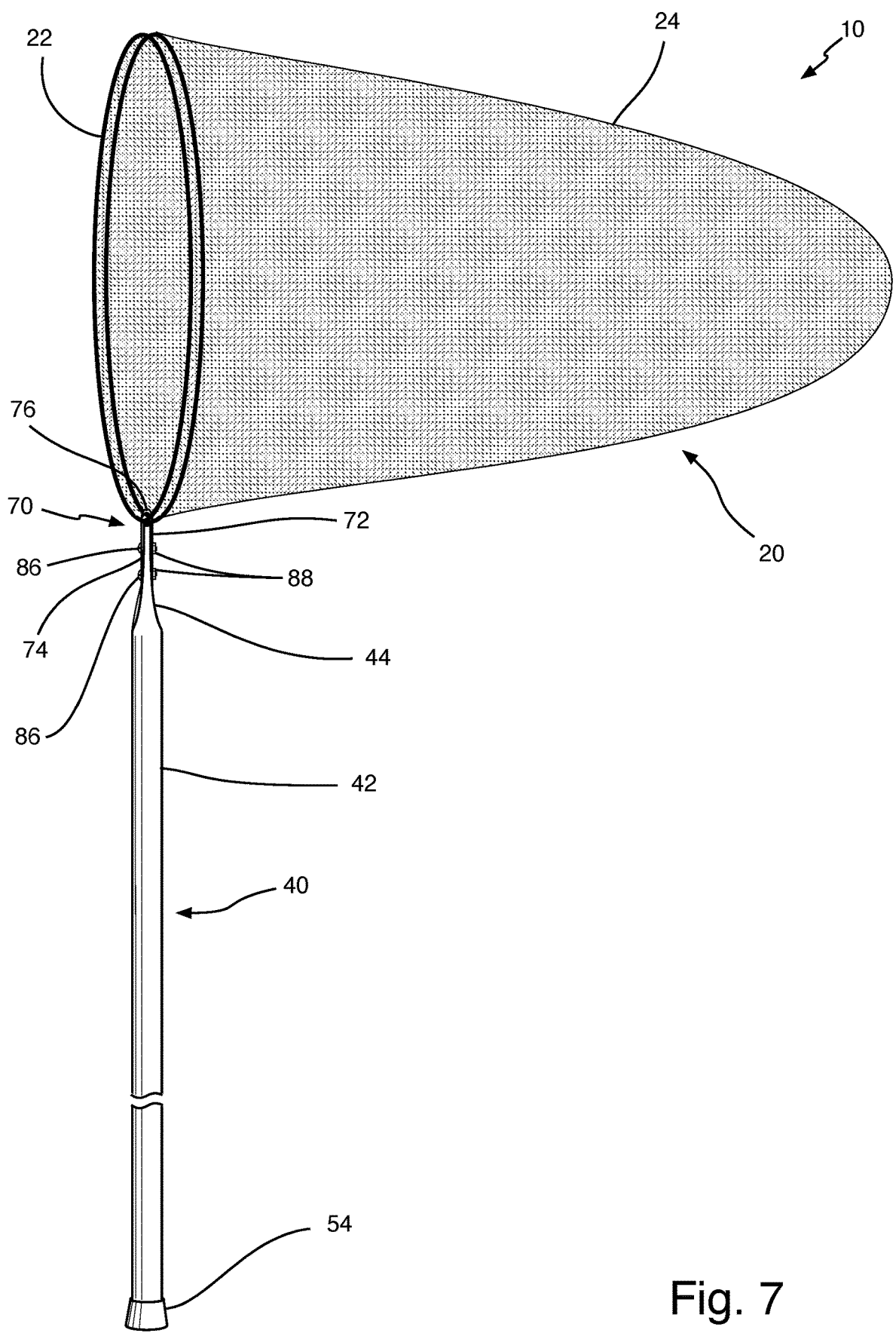
FIG. 7 is an isometric view of the second embodiment of the present invention.

As seen in FIGS. 5, 6, and 7, net frame 22 can be of any geometric shape and size depending on the use of present invention 10. As an example, and without limiting to the following shapes, net frame 22 can be a circular hoop, or have any of the following shapes/configurations: circular, D-shaped, rectangular, triangular, square, hexagon, pentagon, or octagon.

In addition, net frame 22 and distal ends 26 may define any angle depending on the use of present invention 10. More specifically, net frame 22 and handle 42 are secured by retaining frame 70 defining a predetermined angle α. The predetermined angle α varies depending on the application or use of present invention 10. In one embodiment as illustrated in FIG. 4, angle α is approximately 90 degrees.

In another embodiment, such as illustrated in FIG. 5, net frame 22 and handle 42 are secured by retaining frame 70 defining an angle α of approximately 180 degrees.

Frame assembly 70 is easily removable from handle assembly 40 to replace broken nets 24, and/or to exchange out a net frame 22 for a different one with a different angle for a particular use, such as for lobstering, shrimping, butterfly catching, etc.

As best seen in FIG. 6, distal ends 26 are parallel with respect to each other and snugly fit within neck 44, whereby handle 42 receives distal ends 26 through first end 52 of neck 44.

Retaining frame 70 is removably secured onto handle assembly 40. More specifically, retaining frame 70 mounts onto net assembly 20 and neck 44 of handle assembly 40, whereby bend 76 is fitted over a section of net assembly 20 extending to distal ends 26. First and second walls 72 and 74 respectively are secured onto handle 42. As an example, first wall 72, seen in FIG. 5, secures onto first flat side 48 of neck 44, and second wall 74 secures onto second flat side 50 of neck 44. It is noted that bolts or screws 86 pass through retaining frame 70 and neck 44, as seen in FIG. 5, and pass in between distal ends 26 that are spaced apart a predetermined distance and are in a parallel configuration with each other, to secure net assembly 20 onto handle assembly 40. In addition, flat sides 48 and 50 define a predetermined width so as to snugly receive distal ends 26 therein, considering that distal ends 26 are spaced apart a predetermined distance and are in a parallel configuration with each other. It is noted that the predetermined distance that distal ends 26 are spaced apart is slightly wider than a body or shank diameter of each bolt or screw 86.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A dip net, comprising:
   A) a net assembly comprising a net frame with respective distal ends and a net;
   B) a handle assembly connected to said net assembly, said handle assembly comprising a handle having first and second ends, and a neck having first and second flat sides with first and second handle holes; and
   C) a retaining frame securing said net assembly to said handle assembly, said retaining frame comprising first and second walls connected by a bend, wherein said retaining frame is mounted to said net assembly and said handle assembly, and whereby said bend is fitted over a section of said net assembly extending to said distal ends and said first and second walls are secured to said handle.

2. The dip net set forth in claim 1, wherein said first and second flat sides extend from said neck to said first end.

3. The dip net set forth in claim 1, wherein said retaining frame is U-shaped.

4. The dip net set forth in claim 1, wherein said first and second walls each comprise a pair of holes.

5. The dip net set forth in claim 1, wherein said first and second walls comprise first and second frame ends respectively.

6. The dip net set forth in claim 1, wherein said handle receives said distal ends of said net frame through said first end.

7. The dip net set forth in claim 1, wherein said retaining frame is removably connected to said handle assembly.

8. The dip net set forth in claim 1, wherein said first wall is secured onto said first flat side and said second wall is secured onto said second flat side.

9. The dip net set forth in claim 4, wherein said retaining frame is secured to said handle assembly by bolts or screws, and nuts.

10. The dip net set forth in claim 9, wherein each pair of said holes align with respective said first and second handle holes to receive said bolts or screws.

11. The dip net set forth in claim 1, wherein said net frame is configured to be made in a plurality of different shapes and sizes.

12. The dip net set forth in claim 1, wherein said net frame and said handle are secured by said retaining frame defining a predetermined angle.

13. The dip net set forth in claim 12, wherein said predetermined angle is defined by said distal ends with respect to said net frame.

14. The dip net set forth in claim 9, wherein said first and second flat sides define a predetermined width so as to snugly receive said distal ends therein, wherein said distal ends are spaced apart a predetermined distance and are in a parallel configuration with each other.

15. The dip net set forth in claim 14, wherein said predetermined distance that said distal ends are spaced apart is slightly wider than a body or shank diameter of each said bolts or screws.

* * * * *